United States Patent [19]
Maurer et al.

[11] Patent Number: 4,838,829
[45] Date of Patent: Jun. 13, 1989

[54] AUTOMATIC OVERLOAD CLUTCH RESET ARRANGEMENT

[75] Inventors: Reprecht Maurer; Karlheinz Timtner, both of Bad Homburg, Fed. Rep. of Germany

[73] Assignee: Ringspann Albrecht Maurer KG, Bad Homburg, Fed. Rep. of Germany

[21] Appl. No.: 180,607

[22] Filed: Apr. 5, 1988

Related U.S. Application Data

[63] Continuation of Ser. No. 5,485, Jan. 20, 1987, abandoned.

[30] Foreign Application Priority Data

Jan. 25, 1986 [DE] Fed. Rep. of Germany ....... 3602282

[51] Int. Cl.$^4$ .............................................. F16D 7/04
[52] U.S. Cl. .................................... 464/38; 192/56 R
[58] Field of Search ............... 192/56 R, 150; 464/30, 464/37, 38

[56] References Cited

U.S. PATENT DOCUMENTS

| | | | |
|---|---|---|---|
| 2,868,000 | 1/1959 | Gold | 464/37 X |
| 3,927,537 | 12/1975 | Anderson et al. | 192/56 R |
| 4,062,203 | 12/1977 | Leonard et al. | 464/38 |
| 4,637,502 | 1/1987 | Mayr et al. | 192/56 R |

FOREIGN PATENT DOCUMENTS

| | | | |
|---|---|---|---|
| 1112351 | 8/1961 | Fed. Rep. of Germany | 464/37 |
| 184639 | 7/1963 | Sweden | 464/38 |
| 1483331 | 8/1977 | United Kingdom | 192/56 R |

*Primary Examiner*—Daniel P. Stodola
*Attorney, Agent, or Firm*—Frishauf, Holtz, Goodman & Woodward

[57] ABSTRACT

An automatic overload clutch has interfitting clutch elements (10,11;50,51) which are spring-loaded to disengage two coaxial clutch parts (1,2;45,46). To provide for reengagement of the clutch parts after overload, in predetermined angular and rotational orientation, that is, with predetermined angular alignment and/or respective numbers of revolutions of the clutch parts, for example, to associate machine tool operation with certain tool positions, one of the clutch parts carries an engagement key element (37,60) and the other an interfitting engagement lock element (34,62). One of the engagement elements, for example, the lock element, is formed as a ring and movable upon relative rotation of the two clutch parts with recurring, or angular relative displacement. For example, the ring is coupled via a gearing, which may be part of an escapement mechanism (40-42) to the other clutch part to permit engagement of the key element, for example a pin, in the lock element, for example a matching opening, only when the clutch parts have rotated with respect to each other in particular angular relationship and/or a predetermined number of revolutions.

9 Claims, 3 Drawing Sheets

AUTOMATIC OVERLOAD CLUTCH RESET ARRANGEMENT

This application is a continuation, of application Ser. No. 005,485, filed Jan. 20, 1987, now abandoned.

Reference to Related Patents, the disclosures hereby incorporated by reference:
U.S. Pat. No. 3,927,537, Anderson and Manusco
U.S. Pat. No. 4,062,203, Leonard and Taylor

REFERENCE TO RELATED PUBLICATIONS

German Patent Disclosure Document DE-OS No. 34 02 860, Mayr and Dasser.

The present invention relates to an automatic overload clutch, that is, a clutch which disengages if the transfer torque exceeds a predetermined value, and more particularly to such a clutch which has a reset arrangement to reenagage the clutch components or elements only with predetermined angular or rotational alignment. The term "rotational alignment" as used herein is intended to convey the meaning that the clutch elements are reengaged, for example, only after one of the clutch elements, for example, a driven element, has rotated over a predetermined angle which may include a predtermined number of turns or revolutions.

BACKGROUND

Clutches in which two clutch elements can disengage when the torque being transferred exceeds a predetermined value are known, Usually, one of the clutch halves or elements, or parts or components thereof, are shifted axially, or radially, against a spring force, which spring force determines the overload level of the clutch. Clutches of this type are used to protect machines and other devices and plants against overload. The torque being transferred is limited at a suitable position within the drive train of the machine or device, so that it cannot be overloaded and no damage can result. Interengaging overload clutches, that is, positive drive clutches which can disengage upon overload have a distinct advantage with respect to friction clutches. The frictional value of friction clutches is variable and difficult to determine. Positive engagement clutches, thus, can be set for comparatively determined and precise overload torque values, without relying on the uncertain frictional value with respect to maximum transmitted torque.

A typical engagement arrangement of the clutch halves utilizes facing teeth, or gear-like elements which, upon disengaging of the clutch, disengage from each other. Disengagement is effected by shifting at least one of the two clutch elements, or, by shifting the teeth or tooth gaps relatively to each other. Other types of positive engagement clutches, for example claw clutches are known and used.

After the clutch is disengaged due to an overload, the clutch usually remains in disengaged position until manually reengaged. Manual reengagement is effected by shifting the movable clutch element to again obtain interengagement of the clutch parts with respect to each other. The shift movement is usually axial.

Upon disengagement of one clutch element from the other, and resulting disengaged position of the clutch elements, the clutch elements can be reengaged precisely provided that the interengaging elements fit against each other, in other words, that teeth formed on one clutch element, for example, fit into tooth gaps of the other one.

Various types of machinery require reengaging of a driven part with a drive part only at predetermined angular positions. There are cases in which reengagement of the clutch should occur only upon a predetermined relative angular relationship of the clutch halves or parts with respect to each other, so that the drive side of the clutch will be engaged with a driven side only at the predetermined angular relationship. This is necessary when it is desired to obtain a predetermined relationship of a machine which, for example, operates in cadence with a production line; or to prevent starting of a machine, upon reengagement of the clutch, at a maximum loading or at an otherwise undesired or even possibly dangerous condition.

It is, of course, possible to manually rotate the clutch elements, and parts coupled thereto of the driven machine with respect to the drive shaft until the desired condition for reengagement of the clutch is obtained. Such manual alignment is difficult and time-consuming. Additionally, errors and misalignment may result since, and depending on the individual condition, may be dangerous for the operator as well as for the machine. This is of particular importance if the torque to be tansferred is substantial, or large masses are to be driven, and, particularly, to be accelerated.

THE INVENTION

It is an object to provide a simple and reliable arrangement which permits reengagement of a disengageable clutch only when the respective clutch elements have a predetermined angular relationship. This predetermined angular relationship may be below a rotary angle of 360°, but, if desired, may also include multiple revolutions. The arrangement, further, should permit reengagement oven after, for example, the initial predetermined alignment or rotary alignment has been passed, for example inadvertently; and then to permit reengagement not at any relative respective position, but only after the predetermined angular or rotary relationship, as above referred to, is again obtained.

Briefly, and in accordance with the present invention, the clutch includes an arrangement to ensure that reengagement of the clutch elements is possible only at a predetermined relative angular or rotational orientation. The arrangement provides for an engagement key element located at one of the clutch elements or parts, and an engagement lock element located on the other clutch element or parts. One of the engagement elementts has a movable latching arrangement associated therewith which is movable upon relative rotation of the clutch elements with recurring, or regular angular relative displacement of the clutch elements to determine coincidence of the engagement key element and the engagement locking element for form fitting engagement of the key element and the lock element, as well as of the clutch elements; and the recurring or regular angular relative displacement of the clutch parts, or a ponds to interfitting coincidence of the clutc parts, or a multiple of the angular recurrence of the coinceeence of the clutch parts—for example if a plurality of rotations, or a plurality of angularly displaced positions should be passed before the clutch parts or elements are to be engaged.

Preferably, the key element and lock element of the arrangement are adjustably located on the respective clutch part.

The arrangement has the advantage that reengagement of the clutch can be reliably effected only when the key element and the lock element match and fit, and that, thereby and simultaneously, interengaging, interfitting coincidence of the clutch elements is also ensured. This interengaging interfitting arrangement may be effected, for example, by fitting teeth in one clutch part or element into tooth gaps of the other one. In any position in which the conditions of relative desired angular displacement and, further, interfitting of the clutch elements is not obtained, reengagement of the clutch parts or elements is made impossible.

Reengagement of the clutch elements is effected, for example, by operating a manual lever.

In accordance with a preferred feature of the invention, the key element includes an axially projecting pin or cam, projecting from an engagement ring. The free end of the pin or cam fits into a lock ring having suitable openings or an opening for reception of the pin or cam. The lock ring is rotatably arranged on the other clutch half, and driven from the first clutch half, for example by a gearing which permits coincidence of pins and openings only after the respective clutch halves have rotated over a predetermined angle and/or revolution.

The gearing can be formed by providing gear teeth on one clutch half which are in driven relationship to a gearing on the other clutch half, and coupled to the lock ring thereon. In one suitable arrangement, a Geneva, or Maltese cross movement may be used; to prevent backlash, or loose movement, a frictional engagement may be used to brake the respective rotary elements.

In accordance with a feature of the invention, and as an additional reliability factor, engagement elements may be distributed about the circumference of the clutch in non-symmetrical arrangement. Likewise, the lock and key elements may include a plurality of such elements, distributed over the circumference of the clutch, but in an unsymmetrical distribution. The particular arrangement, and the gearing between the clutch elements which provide for engagement only at predetermined rotary or angular orientations can readily be calculated by calculating the respective gear ratios and gear teeth of the engaging elements, in accordance with well-known engineering design.

DRAWINGS

DETAILED DESCRIPTION

Figure 2:
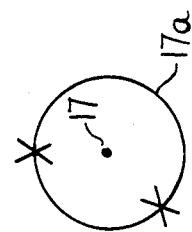
FIG. 2 is a fragmentary view along the section line II—II of FIG. 1.

An overload clutch has two clutch parts 1 and 2 (see FIG. 1) which are positioned coaxially, and relatively rotatable with respect to each other; they are axially fixed. Clutch part 2 has a projecting portion 3 on which a roller bearing 4 and a ball bearing 5 are located, to permit rotation of clutch part 1 with respect to clutch part 2.

The clutch parts can be connected, respectively, to a driving shaft (not shown) and to a torque accepting, or driven shaft, likewise not shown.

The clutch parts 1, 2, face each other with end facing surfaces 6,7. The end facing surface 6 of the clutch part 1 is formed by a ring 9, secured with screws 8 on the clutch part 1 itself. The ring 9 is formed with V-shaped radially directed recesses or cuts 10, uniformly distributed over the circumference, and forming tooth gaps. Teeth 11, carried by the clutch part 2 engage in the gaps 10. The teeth 11 are shaped to match the tooth gaps 10. The forward edge is V-shaped and, thus, defines flat inclined surfaces or flanks 12,13. When the clutch is engaged, the flanks 12,13 engage matching similar flat flanks 14,15 which define the tooth gaps 10.

The teeth 11 are formed on bolts 16, located on the clutch part 1 and facing the clutch part 2. The bolts 16 are parallel to the axis of rotation 17 of the clutch parts and they are rotatable as well as axially shiftably located in the clutch part 2. The rotatability, as well as the axial shiftability of the bolts 16, is limited by engagement pins 18 (see FIG. 2) located in the clutch part 2, and engaging in longitudinal grooves 19 of the bolt 16. The length of the grooves 19 corresponds to the axial shifting path which is required by the bolt 16 in order to permit the teeth 11 to be relieved from engagement with the tooth gaps 10. The grooves 19 are wider, in circumferential direction, than the thickness of the pins 18. The play, or difference in dimension is such that the bolts, upon disengaging of the clutch, can slightly tip of tilt, with respect to engagement of the bearing tooth flank on the engaging bearing flank of the gap, and formed by mutual rotation of the coupling halves or parts 1,2. Thus, the respectively load bearing flanks or surfaces of the tooth gaps 10 and of the teeth 11 will remain in engagement as the clutch disengages, during the entire disengagement time or process, that is, will remain in surface entagement, so that edge engagement, or edge stresses are eliminated. Yet, the spacing is not so wide that the bolts can twist to the extent that the direction of the teeth 11 no longer fits into the gaps 10, which would be undesirable upon reengagement of the clutch.

Figure 1:
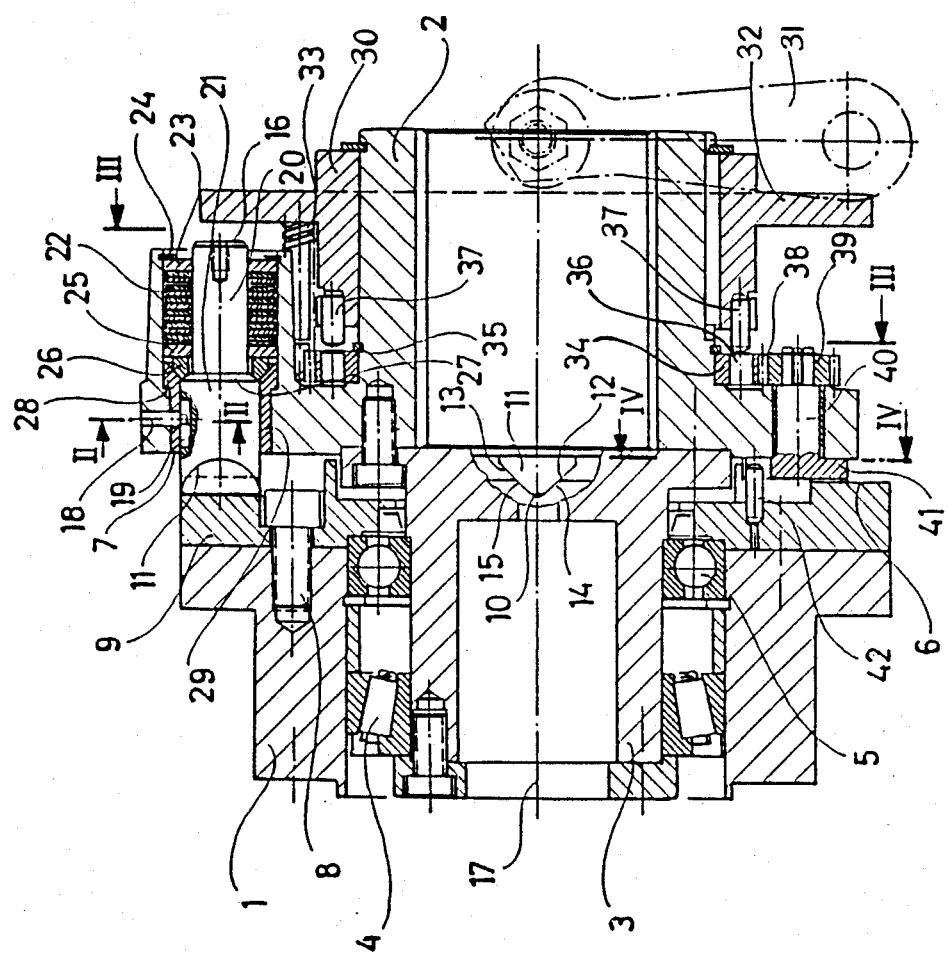
FIG. 1 is a lateral side view of an overload clutch, sectioned along line I—I of FIG. 3.

The bolts 16 have a rear part 20 which has a lesser diameter than the forward part 21—see FIG. 1. A dish or cup spring stack 22 surrounds the rear prt 20. The cup spring arrangement is retained by a washer 23 which, in turn, is retained in the clutch part 2 by a C-expansion ring 24. An intermediate engagement ring or washer 25 is provided, located at the left side of the spring assembly 22—with respectt to FIG. 1, followed by a support ring 26 which is engaged on the bolt 16. The engagement is via a conical surface 27, which forms a transition between the wider diameter part 20 and the thinner diameter part 21 of the bolt 16. The angle of inclination of the conical portion 27 is matched to the forward edge of the support ring 26. The bolt 16 is received in a bore 29 in the clutch part 2. The bore 29 has a conical enlargement which matches conical enlargement formed on the support ring 26. LThe support ring 26 is capable of radial expansion, for example by being construction of a plurality of segments, distributed about the circumference of the bolt 16.

Clutch Operation: Under normal, engaged position, bolts 16 are spring loaded by the spring 22 in the direction towards the clutch part 1. Depending on the force of the springs 22, teeth 11 are held in tooth gaps 10, until the torque being transferred by the clutch exceeds the design transfer torque.

When the design transfer torque is exceeded, spring 22 is overstress%d, and the engaging flanks of the teeth 11 will ride up on the paired flanks of the tooth gaps 10. The function in accordance with which the teeth will ride up, and thus the course of the torque upon disengaging of the clutch can be determined by the inclination of the cone 27 on the one hand, and th conical expansion 28 on the other, along which the support ring 26, by radially expanding, will ride up as the spring 22 compresses. When, finally, upon this rising up, a radial expansion of the support ring 26 has been reached in which the inner diameter thereof corresponds to the outer diameter of the part 21 of the bolt 16, the bolt 16 can slip towards the right—with reference to FIG. 1—with its part 21 into the support ring 26. The bolt 16 then will have applied thereto only a radially inwardly directed clamping force of the support ring 26, but no longer an axial force due to the spring 22. The instant of time at which the part 21 of the bolt 16 can slip into the now expanded support ring 26 corredponds to the instant of time in which the respective tooth 11 comes free from the respective tooth gap 10, associated therewith.

REENGAGING MECHANISM FOR THE DISENGAGED CLUTCH

When the clutch is disengaged, bolts 16 will extend beyond the end face of the clutch part 2 with the ends remote from the engagement teeth 11. In order to reengage the clutch, an axially shiftable engagement or switching ring 30 can be moved axially towards the left—with respect to FIG. 1—by operating a handle 31, until a flange 32 on the ring 30 engages the bolts 16 to move the bolts 16 in the direction towards the clutch part 1. The movement of the engagement ring 30 can be spring loaded, that is, counter the pressure of one or more circumferentially located springs 33.

In accordance with the invention, the clutch can be reengaged only when the clutch parts 1 and 2 have a predetermined relative angular or rotary relationship. For example, a relative rotation of 180° can be commanded, or a plurality of revolutions, and/or fractions of revolutions. In accordance with the present invention, the engagement of the clutch thus is angularly controlled and determined.

The reengagement includes an engagement locking element in form of a locking ring 34, having external gear teeth 38 thereon. The gear teeth 38 are coupled to the pinion 39 which is rotatably retained on the clutch part 2. Pinion 39 is fixed on a shaft 40, rotatable parallel to the axis 17 of the clutch parts 1,2. The other end of the shaft 40 carries an escapement or Moltese cross wheel 41—see FIG. 4—of an indexing mechanism which cooperates with a lantern pin 42, secured to the ring 9 on the clutch part 1. The operation of a pin wheel—escapement gear combination, also known as a Moltese cross, is well known, and need not be described in detail.

The locking ring 34 is rotatable on the clutch part 2, but axially retained in position by a snap C ring 35. The locking ring 34 is formed with two diametrically oppositely positioned axial bores 36 into which, when the clutch parts are in proper engagement, two holding elements in the form of diametrically oppositely positioned pins can fit. The pins 37 are secured to the engagement ring 30 and facing the locking ring 34.

OPERATION OF ANGULAR ENGAGEMENT LOCK

Figure 3:
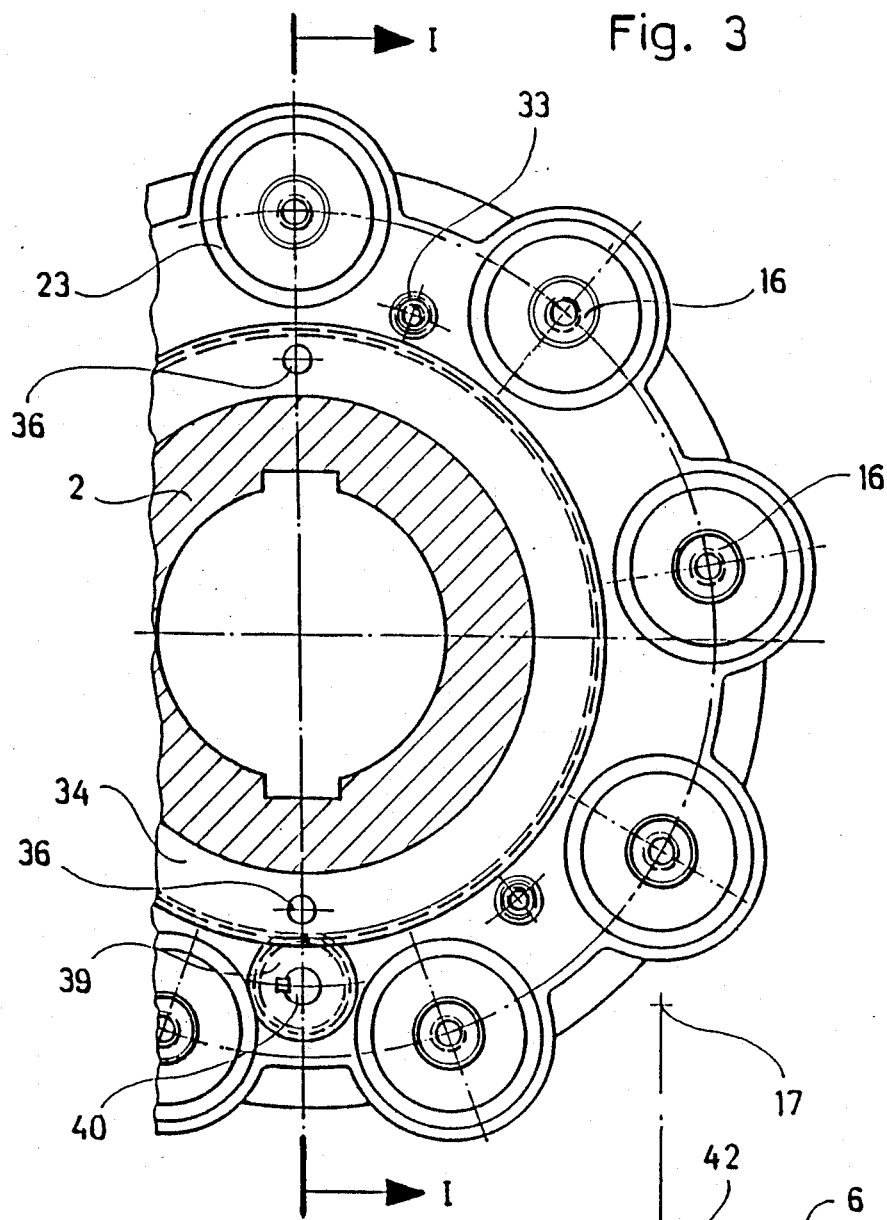
FIG. 3 is a fragmentary view of the clutch along section line III—III of FIG. 1.
Figure 4:
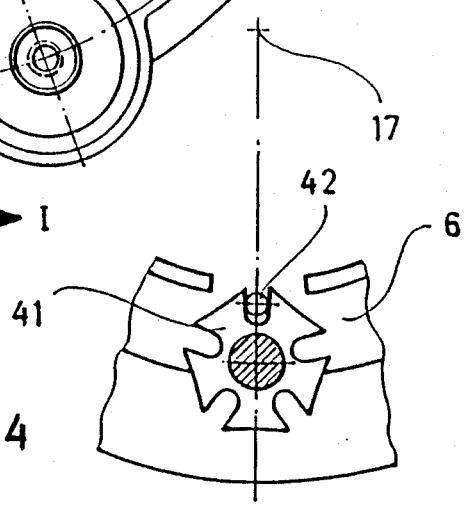
FIG. 4 is a fragmentary view along section line IV—IV of FIG. 1.

The escapement wheel 41 (FIG. 4) is rotated by a division, in the present case by an angle of 72°, when the two coupling parts 1,2 have been moved by an angle of 360° with respect to each other; this is best seen by reference to FIG. 3. The bores 36 of the locking ring 34 permit engagement of the clutch parts only when the locking ring 34 had been shifted by an angle of 180°. Thus, by suitably dimensioning the gear teeth on the locking ring 34 and on the pinion 39, it can easily be determined how many relative revolutions the coupling parts 1,2 must carry out before the possibility again arises to reengage the clutch. As shown in FIG. 4, wheel 41 has 5 divisions or notches, so that 5 relative revolutions between coupling parts 1 and 2 anr required to re-engage the clutch. Reengagment of the clutch presupposes that the pins 37 are immediately opposite the bores 36 in locking ring 34 when, also, the teeth 11 match gaps 10. If this is not the case, particularly if the teeth 11 tooth gaps 10, or bores 36 in locking ring 34 and pins 37. are located about the circumference of the clutch parts must be rotated with respect to each other until booth the conditions are met:

(1) teeth 11 on the bolts 16 match the tooth gaps 10; and (2) bores 36 of ring 34 match position of the pins 37

The number of the necessary relative revolutions, or part revolutions of the clutch parts can readily be calculated by considering the division ratio of the escapement wheel, and the gear teeth of the pinion 39 and gear 34.

The arrangement additionally prevents that the clutch can be reengaged if the matching situation has been exceeded, for example inadvertently. Exceeding the "match" position causes corresponding movement of the locking ring 34. In order to ensure possible reengagement even after comparatively short exceeding often the "match" position, a further lantern pin 42 can be located, in the direction of rotation, beyond the pin 42. This further pin must be considered in the calculation; upon exceeding of the above referred to "engagement" position, however, it will prevent engagement of the clutch if a "match" position has been exceeded.

When the necessary number of revolutions, or part revolutions, or multiples thereof have occured, so that a "match" situation occurs between the locking ring 34 and the key pins 37, without, however, the conditions pertaining that the teeth 11 match the tooth gaps 10, engagement of the clutch is impossible since the bolts 16, and hence the rings 30 cannot be moved in the direction towards the clutch part 1.

Figure 7:
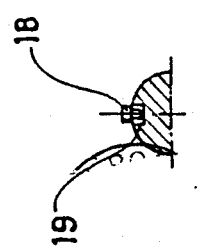
FIG. 7 is a highly schematic representation of a non-symmetrical arrangement of lock elements about the circumference of the clutch.

Non-symmetrical placement of the teeth 10 and tooth gaps 11, or of bores 36 and pins 37, respectively, is schematically shown in FIG. 7, in which X marks indicate such non-symmetrical locations, which can be located anywhere non-symmetrically on a circle 17a having the center axis 17 and representing the circumference of the clutch.

Figure 5:
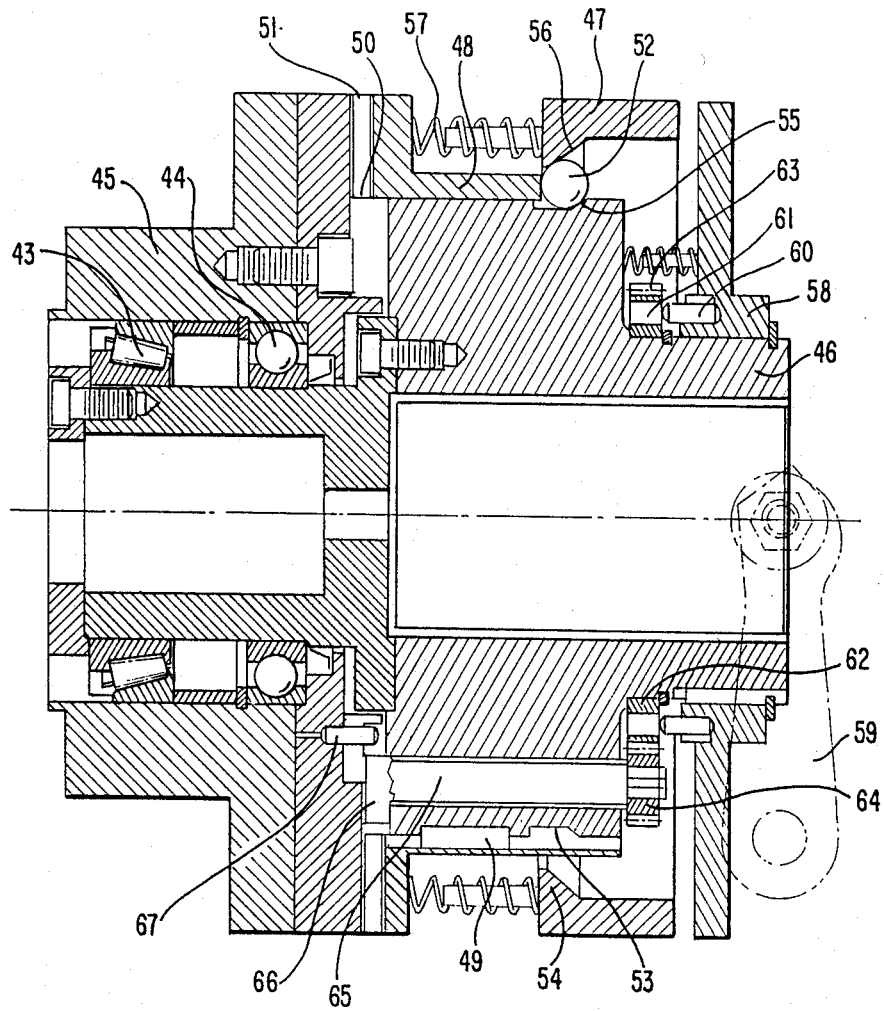
FIG. 5 is a vertical sectional view of a different type of overload clutch from that illustrated in FIG. 1, and incorporating the features of the present invention.

The invention is not restricted to a clutch in which the two clutch parts are axially fixed, and rely on engagement for movable bolts 16. Referring to FIG. 5: a first clutch part 45 is axially fixed to a shaft (not shown). A hub element 46 is coaxially located on a second shaft on which active clutch parts 47, 48 are axially slidable.

They are held non-rotatable by interengagement with a spline, groove and spring connection 49. The facing surfaces of the clutch parts 45 and 47, 48 are formed with gear teeth 50, 51 which, when the clutch is engaged, provides for an interengaging clutch fit between the respective clutch elements, and hence transmission of torque between the respective clutch parts. Clutch part 45 is rotatable with respect to the clutch part 46 via roller bearing 43 and ball bearing 44.

The axially shiftable clutch parts are formed by the two coaxially shiftable elements 47 and 48. The element 48 is formed with circumferential openings in a neck portion thereof, within which balls 52 are retained. When the clutch is engaged, the balls 52 are retained in a groove 53 of the hub 46 of the right clutch part, and prevented from radial escape by a radially inwardly projecting flange 54 of the element 47.

Operation: Let it be assumed that the torque being transmitted by the clutch becomes excessive. Upon disengagement, due to overload, the balls 52 will travel along the inclined surface 55 of the groove 53 radially outwardly and thus press the element 47 over the inclined surface 56 of the flange 54 counter the spring 57 located between th parts 47, 48 when, however, the balls 52 have completely left the groove 53, the axially shiftable clutch part formed by the elements 47, 48 may travel towards the right—with respect to FIG. 5, for such a distance that the teeth 50, 51 will lose engagement.

To reengage the clutch, an axially shiftable ring 58 is provided, manually operated, for example by a hangle 59, shifting the elements 47, 4 towarda the left—with respect to FIG. 5—until the balls 52 again enter the groove 53, into which they are pressed under the effect of the spring 57 and the inclined surface 56.

In accordance with the present invention, the clutch can be reengaged, however, only if a predetermined rotary position between the clutch part 45 and 47, 48, respectively, obtains. Thus, a reengagement locking arrangement is provided which, basically, is similar to that of the locking arrangement described in connection with FIGS. 1 to 4.

The ring 58 carries pins 60 which fit in bores 61 of a locking ring 62 rotatably located on the hub part 46. The pins fit into the bores 62 only when the clutch parts are in proper angular and rotational position. A pinion 64 is in gear engagement with a gearing 63 of the locking ring 62. The pinion is secured to a shaft 65. The other end of the shaft 65 is coupled to an indexing wheel 66 which corresponds to and, for example, is shaped like the indexing wheel 41 of FIG. 4. The indexing or escapement wheel 66 cooperates with a lantern pin 67, corresponding to pin 42 (FIG. 4), secured to the clutch part 45.

The operation of the arrangement is similar to that described in connection with FIGS. 1-4 and, thus, need not be repeated herein. Shafts 40 (FIG.1) and 65 (FIG.5) are rotatably secured, for example in a suitable bearing, in the respective clutch part 2, 46; the pinion 39, 64 is secured to the shaft so that rotation of the shaft upon switching of the escapement wheel 41, 66, the pinon 39 is rotated which, in turn, rotates the ring 34, 62 to align the holes in the locking ring with the key pins 37, 60 only when predetermined angular and rotational conditions of the respective clutch parts have been met. Various changes and modifications may be made and features described in connection with one of hte embodiments may be used with the other, within the scope of the inventive concept.

Figure 6:
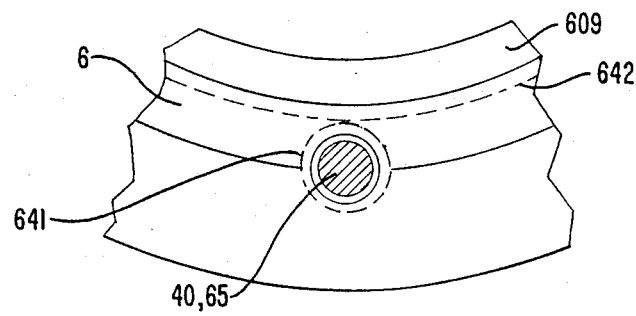
FIG. 6 is a fragmentary detail view illustrating a modification.

For some relative angular rotational alignments, it may be desirable to use a continuous gear transmission between the two clutch parts. FIG. 6 illustrates such an arrangement in which the shaft 40 or 65, respectively, is coupled to a pinion 641. The pinion 641 is in engagement with a gear 642 secured to the clutch part 1, for example to the attached part 609 which corresponds to part 9 (FIG. 1).

We claim:

1. Automatic overload clutch comprising
   two coaxial clutch parts (1, 2; 45, 46, 47, 48);
   interfitting clutch elements (10, 11; 50, 51) located, respectively, on said clutch parts;
   spring means (22; 57) engaging the clutch elements with each other while permitting axial separation of the clutch elements when torque being transferred between the clutch parts exceeds a predetermined value;
   controllable reengagement operating means (30, 31, 32, 33; 58, 59) to reengage said clutch parts after separation due to overload; and
   means for ensuring reengagement of the clutch elements with predetermined angular or rotational orientation of said clutch parts additionally including
   an engagement lock element (34; 62) independent of said interfitting clutch elements (10, 11; 50, 51);
   an engagment holding element (37; 60) independent of said interfitting clutch elements (10, 11; 50, 51), located on one (2) of the clutch parts and selectively engageable with the lock element; and
   coupling means (38-42; 63-67) having a first part (42; 67) coupled to one (2; 46) of said clutch parts, and a second part (38-41; 63-66) coupled to the other (1; 47, 48) of said clutch parts and to one of said engagement elements and movable upon relative rotatin of said clutch parts with recurring or regular angular relative displacement of said clutch parts to determine coincidence of the engagement holding element and the engagement lock element; and
   wherein said recurring or regular angular relative displacement of said clutch parts corresponds to interfitting coincidence, or a multiple of angular recurrences of said coincidence of said predetermined angular or rotational orientation of the clutch parts.

2. The clutch of claim 1, wherein at least one of: said engagement holding element (37; 60) and said engagement lock element (34; 62), is movably adjustably positioned on the respective clutch part to permit interengagement movement of said engagement holding element (37; 60) and lock element (34; 62).

3. The clutch of claim 2, wherein the engagement holding element comprises at least one axially projecting pin or cam (37; 60);
   the controllable reengagement operating means comprises an engagement ring (30; 58)
   the interfitting clutch elements (10, 11; 50, 51) include a clutch element part (11; 51) which is axially movable, and positioned on one of said clutch parts (2; 46);
   the engagement ring being located on said one clutch part (2; 46) which carries the axially movable clutch elements;

said engagement lock element comprises a locking ring (34; 62) having at least one bore (36; 61) facing and fitting around the respective pin or cam;

said locking ring (34; 62) being rotatable on the associated clutch part (2; 46);

and wherein said drive means are (42; 67) coupled to the other one (1; 45) of said clutch parts and drive said locking ring, whereby relative rotation of said clutch parts will cause coincident positioning of the bore or bores (36; 61) with the pins or cams (37; 60) only at predetermined angular and rotational orientation of the clutch parts.

4. The clutch of claim 3, wherein said drive means comprises an external gearing (38,63) formed on the locking ring (34; 62);

a pinion (39,64) in engagement with said external gearing; and a driven connection (40-42;65-67) coupled to the other one (1;45) of said clutch parts and driving said pinion (39;64).

5. The clutch of claim 4, wherein said drive connection comprises a gear drive (67,66) coupled to the other one (1;45) of said clutch parts.

6. The clutch of claim 4, wherein said drive connection includes an indexing or escapement gear drive, comprising an escapment or switching or indexing wheel (41;66) coupled to a shaft (40;65) and rotating said pinion (39,64) and a lantern pin (62;64) located on said other clutch part (1).

7. The clutch of claim 4, whereih said drive connection includes a continuous gear drive.

8. The clutch of claim 1, wherein a plurality of engagement lock elements (34; 62) and engagement holding elements (37; 60) are provided, located circumferentially distributed about the circumference of the clutch and non-symmetrically arranged thereabout.

9. The clutch of claim 1, wherein the interengaging clutch elements (10,11;50,51) are non-symmetrically distributed about the circumference of the respective clutch parts.

* * * * *